United States Patent
Gonzales et al.

(10) Patent No.: US 12,132,316 B2
(45) Date of Patent: Oct. 29, 2024

(54) METHOD FOR CONTROLLING AN ELECTRICAL TRANSMISSION NETWORK

(71) Applicants: Supergrid Institute, Villeurbanne (FR); Centralesupelec, Gis-sur-Yvette (FR); Centre National De La Recherche Scientifique, Paris (FR); Universite Paris-Saclay, Saint Aubin (FR)

(72) Inventors: Juan Carlos Gonzales, Lyons (FR); Valentin Costan, Lyons (FR); Gilney Damm, Lyons (FR); Abdelkrim Benchaib, Lyons (FR); Françoise Lamnabhi-Lagarrigue, Lyons (FR); Bruno Luscan, Lyons (FR)

(73) Assignees: Supergrid Institute, Villeurbanne (FR); Centralesupelec, Gis-Sur-Yvette (FR); Centre National De La Recherche Scientifque, Paris (FR); Universite Paris-Saclay, Saint Aubin (FR)

( * ) Notice: Subject to any disclaimer, the term of this patent is extended or adjusted under 35 U.S.C. 154(b) by 352 days.

(21) Appl. No.: 17/621,529

(22) PCT Filed: Jun. 25, 2020

(86) PCT No.: PCT/EP2020/067927
§ 371 (c)(1),
(2) Date: Dec. 21, 2021

(87) PCT Pub. No.: WO2020/260519
PCT Pub. Date: Dec. 30, 2020

(65) Prior Publication Data
US 2022/0352719 A1  Nov. 3, 2022

(30) Foreign Application Priority Data
Jun. 26, 2019  (FR) ..................................... 1906968

(51) Int. Cl.
*H02J 3/36* (2006.01)
*G05B 19/042* (2006.01)

(52) U.S. Cl.
CPC .............. *H02J 3/36* (2013.01); *G05B 19/042* (2013.01); *G05B 2219/2639* (2013.01)

(58) Field of Classification Search
CPC ...................................................... H02J 3/36
(Continued)

(56) References Cited

U.S. PATENT DOCUMENTS

2015/0311813 A1* 10/2015 Gaudenz ................. H02M 5/10
363/35
2018/0175622 A1*  6/2018 Brorsson ................... H02J 3/36

FOREIGN PATENT DOCUMENTS

CA   2238970 A1   6/1997
EP   3035476 A1   6/2016
(Continued)

OTHER PUBLICATIONS

Renedo, J. et al., "Active Power Control Strategies for Transient Stability Enhancement of AC/DC Grids With VSC-HVDC Multi-Terminal Systems", IEEE Transaction on Power Systems.

*Primary Examiner* — Joseph Chang
(74) *Attorney, Agent, or Firm* — GableGotwals (57) ABSTRACT

A method for controlling an electrical transmission network including a plurality of DC high-voltage lines and at least three AC/DC converters which are identified by a respective index i and are interconnected by the DC high-voltage lines. Each of the AC/DC converts are connected to an AC voltage bus identified by a respective index i as well as to one of the DC high-voltage lines.

9 Claims, 7 Drawing Sheets

(58) Field of Classification Search
USPC .......................................................... 307/82
See application file for complete search history.

(56) References Cited

FOREIGN PATENT DOCUMENTS

| | | |
|---|---|---|
| WO | WO 2012000548 A1 | 1/2012 |
| WO | WO 2014053171 A1 | 4/2014 |
| WO | WO 2019097183 A1 | 5/2019 |

* cited by examiner

METHOD FOR CONTROLLING AN ELECTRICAL TRANSMISSION NETWORK

CROSS-REFERENCE TO RELATED APPLICATIONS

This United States application is the National Phase of PCT Application No. PCT/EP2020/067927 filed 25 Jun. 2020, which claims priority to French Patent Application No. 1906968 filed 26 Jun. 2019. each of which is incorporated herein by reference The invention relates to strategies for controlling electrical networks, in particular to control strategies for ensuring the stability of electrical networks including several converter stations of a meshed DC network connected via several DC power lines, designed to allow power exchange between AC buses.

Integration of meshed DC networks into AC networks is a promising technology to allow control of active and reactive power and to facilitate input of power from renewable sources into the AC network.

A malfunction in the network is sometimes manifested by a transient power imbalance, with some generators accelerating and others decelerating. We can then observe an evolution of the phase shift between the AC voltage buses of the network. If the system cannot return to equilibrium after a disturbance, it can become unstable because the power generators can run asynchronously and power exchange can no longer be assured. For example, power generators can become disconnected from the network.

Such integration of meshed DC networks does, however, in practice reduce the margin of transient stability of these AC networks. This makes it easier for such networks to become unstable after major disturbances.

The publication entitled 'Active Power Control Strategies for Transient Stability Enhancement of AC/DC Grids With VSC-HVDC Multi-Terminal Systems', by Javier Renedo et al., in IEEE Transactions on Power Systems, vol. 31, no. 6, pages 4595-4605 in November 2016, describes a control solution for improving transient stability of AC networks. In this solution, different conversion point converters are interconnected by means of high-voltage DC lines, with a point-to-point link being formed between each pair of converters. In particular, this document proposes measuring the frequencies on each of the AC buses and subsequently applying a correction to the active power setpoint of each of the DC network converters, wherein the correction to the active power of a converter is a function of a frequency measurement on the AC network bus connected to this converter. The frequency on an AC bus may also be identified as the angular velocity of the voltage. Instantaneous angular velocity measurement can be performed using a phasor measurement unit.

Such a control method proves inadequate in providing a sufficient increase in the transient stability margin, particularly during specific disturbances. Generally speaking, it is tricky to quickly adapt the power settings to be applied to the converters to meet the needs of the network, while respecting the electrical limitations of the converters and the high-voltage DC lines connecting these converters.

The invention aims to overcome one or more of these drawbacks. The invention thus relates to a method for controlling an electrical transmission network, as defined in the appended claims.

The invention also relates to the variants of the dependent claims. A person skilled in the art will understand that each of the characteristics of the description or of a dependent claim may be combined independently with the characteristics of an independent claim, without this constituting an intermediate generalisation.

Other characteristics and advantages of the invention will become clearly apparent from the description thereof that is given below, by way of non-limiting indication, with reference to the appended drawings, in which.

Figure 1:
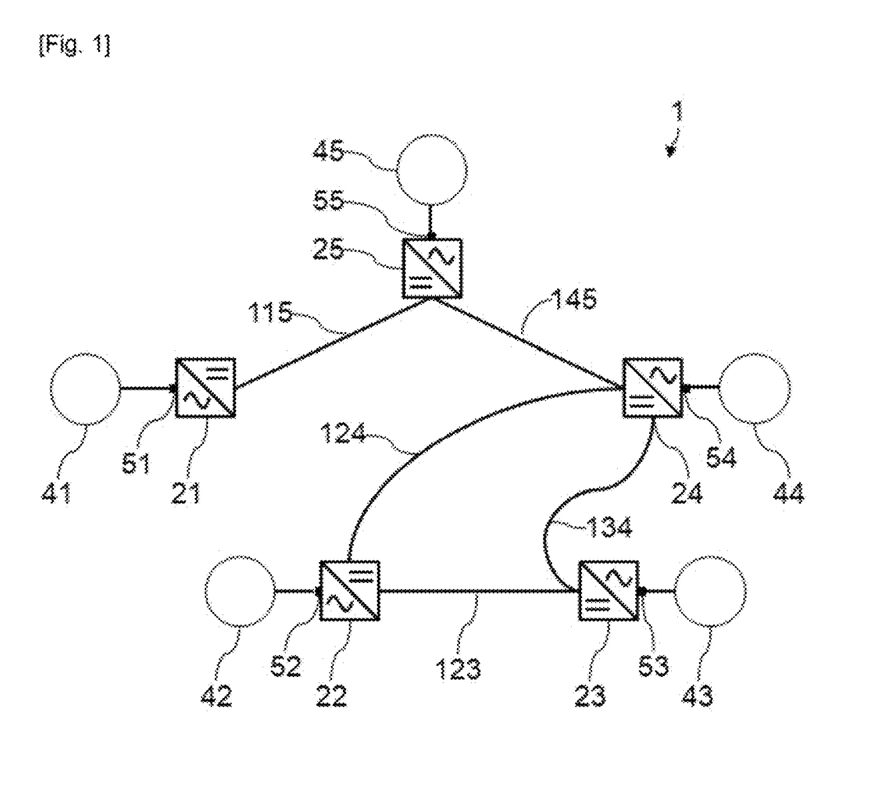
FIG. 1 is a schematic representation of an example of an electrical distribution network for implementation of the invention.

FIG. 1 schematically illustrates an example of an electrical distribution network 1, incorporating a high-voltage DC network with multiple converter stations. The electrical distribution network thus comprises converter stations, each including a respective AC/DC converter. The converter stations include converters, 21 to 25, respectively. The converters 21 to 25 are, for example, modular multilevel converters. Each of the converters 21 to 25 has a DC interface connected to at least one DC interface of another converter, via a high-voltage DC line. The DC interfaces of the converters 21 and 25 are thus connected via the high-voltage line 115, the DC interfaces of the converters 24 and 25 are thus connected via the high-voltage line 145, the DC interfaces of the converters 21 and 23 are thus connected via the high-voltage line 123, the DC interfaces of the converters 22 and 24 are thus connected via the high-voltage line 124, and the DC interfaces of the converters 23 and 24 are thus connected via the high-voltage line 123.

Thus, the invention can be implemented for cases where there are no point-to-point high-voltage DC links between the DC interfaces of each of the pairs of converters. Thus, there is no DC high-voltage line between converters 21 and 22, between converters 21 and 23, between converters 21 and 24, between converters 22 and 23, between converters 22 and 25, and between converters 23 and 25.

In addition, each of the converters 21 to 25 includes a respective AC interface. The AC interface of each of the converters 21 to 25 is connected to an AC voltage bus 51 to 55, respectively. Each of the buses 51 to 55 is connected to an AC network 41 to 45, respectively. In the example illustrated, there are no interconnections between the AC networks 41 to 45. One may, however, contemplate interconnections between some of the AC networks, as in the simplified example illustrated in FIG. 3. Hence, in the example in FIG. 3, a link 523 connects the bus 53 to the bus 52. Two machines 42 and 422 are connected here to the bus 52.

According to the invention, the active power between two converters of the network (linked either directly or indirectly by a high-voltage DC line) is modulated by rules stored in each of these converters, respecting the power limits of these two converters. Active power modulations can thus be performed very quickly on the network, while observing the electrical dimensioning rules of the converters and high-voltage DC lines.

More specifically, each of the converters of index i applies a power setpoint $Pdc_i$ with $$Pdc_i = \sum_{j=1}^{n} P_{conx_{ij}} \text{ where } i \neq j \text{ and } P_{conx_{ij}} = -P_{conx_{ji}}. \quad \text{[Math. 13]}$$

where $Pconx_{ij}$ is a power reference exchanged between the bus of index i and the bus of index j via the electrical transmission network 1, n being the number of converters connected to the AC voltage buses 41 to 45.

Each converter of index i stores, for each of the other converters, the maximum power reference sent:

$$P_{Conx_{ij}}^{Max} \text{ where } i \neq j \quad \text{[Math. 14]}$$

sent from the bus i to the bus j via the electrical transmission network 1.

Each converter of index i stores, for each of the other converters, the maximum power reference received $$P_{Conx_{ij}}^{min} \text{ where } i \neq j \quad \text{[Math. 15]}$$

received by the bus i from the bus j via the electrical transmission network 1.

Each converter of index i defines each power reference $Pconx_{ij}$ such that it observes the values of maximum power sent and maximum power received, as stored.

Advantageously:

$$P_{Conx_{ij}}^{min} = -P_{Conx_{ij}}^{Max} \quad \text{[Math. 16]}$$

Advantageously, in order to define each power reference $Pconx_{ij}$, each converter of index i stores it maximum active power sent over the transmission network:

$$P_{DC_i}^{Max} \quad \text{[Math. 17]}$$

and each converter of index i stores its maximum active power received by the transmission network 1:

$$P_{DC_i}^{min} \quad \text{[Math. 18]}$$

wherein each converter of index i defines the power reference $Pconx_{ij}$ such that the following relationships are verified:
[Math. 19]

$$P_{DC_i}^{Max} \geq \sum_{j=1}^{n} P_{Conx_{ij}}^{Max} \text{ where } i \neq j \,\# \quad \text{[Math. 19]}$$

$$P_{DC_i}^{min} \leq \sum_{j=1}^{n} P_{Conx_{ij}}^{min} \text{ where } i \neq j \quad \text{[Math. 20]}$$

with:

$$P_{Conx_{ij}}^{Max} = -P_{Conx_{ji}}^{min} \text{ where } i \neq j. \quad \text{[Math. 21]}$$

According to an operating mode in connection with an operator of the transmission network 1, the control method comprises:

for each of the converters of index i, an active power setpoint value Pdc0i applied by an operator of the transmission network 1 is recovered;

each of the converters of index i modifies the active power setpoint Pdc0i by a value ΔPi, with Pdc0i+ΔPi=Pdci.

Hence, the modification ΔPi of the active power setpoint is implemented in such a way that the previous rules on Pdci values are observed.

Figure 4:
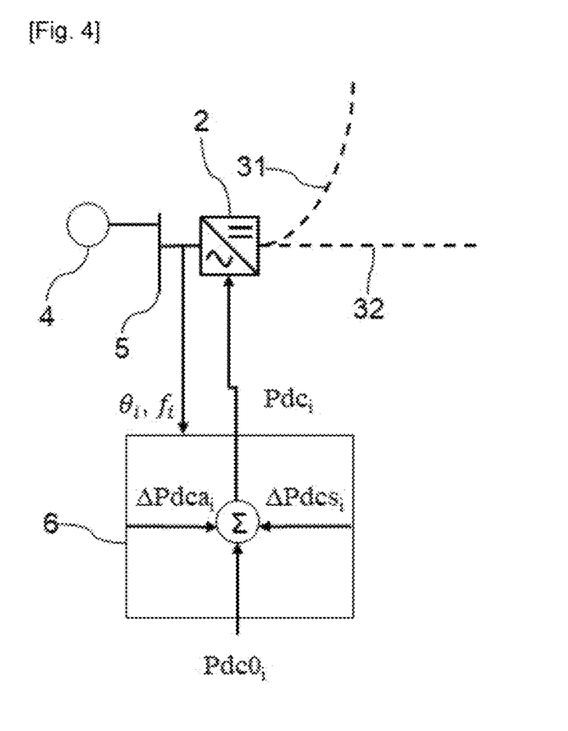
FIG. 4 is a diagram illustrating an example of a method of controlling a converter in a system according to the invention.

Functioning at a converter station including a converter 2 for the implementation of a variant of the invention is illustrated by means of the diagram in FIG. 4. According to this alternative, a synchronizing power correction and a damping power correction are applied. According to this alternative, it is also possible to apply only synchronizing power correction or only damping power correction.

The following operations are carried out for each of the converters 2 of the converter stations. For a converter 2 of index i present in a converter station, the operator supplies an active power setpoint value $Pdc0_i$. The control circuit 6 of the converter 2 thus recovers this active power setpoint value $Pdc0_i$. The control circuit 6 recovers instantaneous values of voltage Vi, of voltage angle $\theta_i$ and advantageously of frequency $f_i$ of this voltage, on the AC voltage bus 5 connected to the AC network 4. The values Vi, $\theta_i$ and $f_i$ can be recovered by a phase-locked loop on the bus 5. The continuous interface of the converter 2 is connected in this case to the high-voltage DC lines 31 and 32, for point-to-point connection with other converters of other converter stations.

The control circuit 6 modifies the active power setpoint $Pdc0_i$, by applying the active power setpoint value $Pdc_i$ to the converter 2, adding a term $\Delta Pdcs_i$ to the active power setpoint value $Pdc0_i$ with:

$$\Delta P_{dcs_i} = \sum_{j=1}^{n} k_{\delta_{ij}}\left((\theta_i - \theta_j) - \theta ref_{ij}\right) \text{ where } i \neq j \text{ and } k_{\delta_{ij}} = k_{\delta_{ji}} \quad \text{[Math. 22]}$$

where n is the number of converters connected to the AC voltage buses, $k\delta_{ij}$ is an adjustment parameter of contribution to a corrective power of synchronization and $\theta ref_{ij}$ is a reference of the difference in angles between buses i and j in steady state. Advantageously, $\theta ref_{ij}$ has a non-zero value to take account of a reference phase shift between the buses i and j.

With such a mode of operation, at least one synchronizing power term can be added between each pair of converters, even if there is no point-to-point high-voltage link between these converters. In such a mode of operation, the operator of the transmission network 1 only needs to supply the active power setpoint values $Pdc0_i$ and the references of the angles $\theta ref_{ij}$ to the converters.

Advantageously, the converter of index i determines a converter k to which the power value $Pconx_{ik}$ exchanged between the bus of index i and the bus of index k via the electrical transmission network 1 is greater than the respective power value that the converter of index i emits to each of the other converters if $$(\theta_i - \theta_k) > (\theta_i - \theta_j) \text{ where } i \neq j \text{ and } j \neq k \quad \text{[Math. 23]}$$

Advantageously, the control circuit 6 modifies the active power setpoint Pdc0$_i$, by applying the active power setpoint value Pdc$_i$ to the converter 2, adding a term ΔPdca$_i$ to the active power setpoint value Pdc0$_i$, with:

$$\Delta P_{dca_i} = \sum_{j=1}^{n} k_{f_{ij}}(f_i - f_j) \text{ where } i \neq j \text{ and } k_{f_{ij}} = k_{f_{ji}} \qquad [\text{Math. 24}]$$

where kf$_{ij}$ is an adjustment parameter of contribution to a corrective damping power.

The active power setpoint value Pdc$_i$ may in this case adopt the following value:

$$P_{dc_i} = P_{dc0_i} + \Delta P_{dca_i} + \Delta P_{dcs_i} \qquad [\text{Math. 25}]$$

Figure 3:
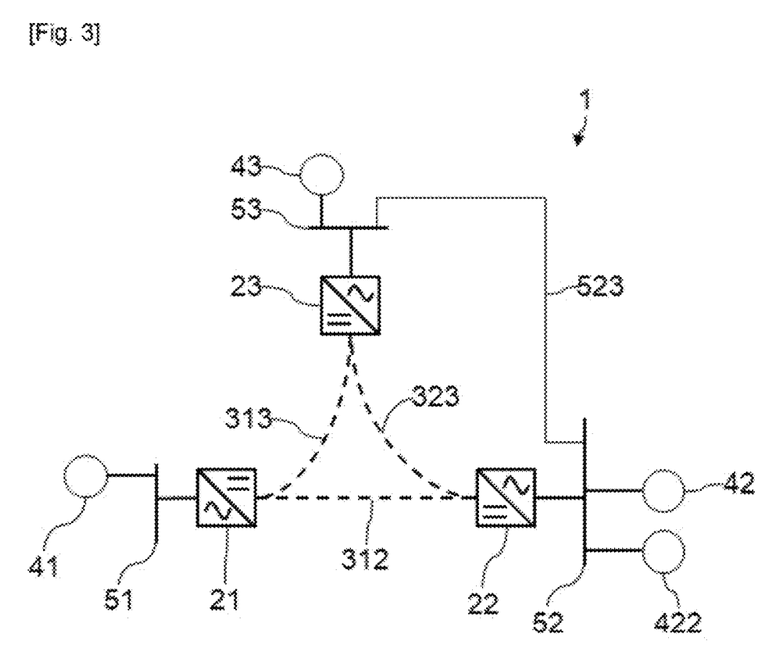
FIG. 3 represents a simplified network with interconnection between AC network buses.

For the example of a simplified network illustrated in FIG. 3, the active power setpoint values for the converters 21 to 23 are as follows:

$$P_{dc1} = P_{dc01} + k_{\delta_{12}}(\theta_1 - \theta_2 - \theta ref_{12}) + \qquad [\text{Math. 26}]$$
$$k_{\delta_{13}}(\theta_1 - \theta_3 - \theta ref_{13}) + k_{f_{12}}(f_1 - f_2) + k_{f_{13}}(f_1 - f_3)$$

$$P_{dc2} = P_{dc02} + k_{\delta_{21}}(\theta_2 - \theta_1 - \theta ref_{21}) + \qquad [\text{Math. 27}]$$
$$k_{\delta_{23}}(\theta_2 - \theta_3 - \theta ref_{23}) + k_{f_{21}}(f_2 - f_1) + k_{f_{23}}(f_2 - f_3)$$

$$P_{dc3} = P_{dc03} + k_{\delta_{31}}(\theta_3 - \theta_1 - \theta ref_{31}) + \qquad [\text{Math. 28}]$$
$$k_{\delta_{32}}(\theta_3 - \theta_2 - \theta ref_{32}) + k_{f_{31}}(f_3 - f_1) + k_{f_{32}}(f_3 - f_2)$$

For calculation of the parameters kδ$_{ij}$ and kf$_{ij}$, account is taken of the fact that the dynamics of the high-voltage DC network are much greater than the dynamics of the AC networks and the electromechanical machines connected to them. The algebraic equations describing the behaviour of the high-voltage DC network can thus neglect the latter's dynamics, by representing each converter station by its current input model.

In the absence of any significant energy storage device in the high-voltage DC network, the sum of the powers fed into this high-voltage DC network is defined as equal to the sum of the powers exiting this high-voltage DC network. In the example in FIG. 3, the following equation must be observed:

$$P_{dc1} + P_{dc2} + P_{dc3} = 0 \qquad [\text{Math. 29}]$$

Furthermore, during normal operation, the current and voltage control ensures the following equation:

$$P_{dc01} + P_{dc02} + P_{dc03} = 0 \qquad [\text{Math. 30}]$$

The contribution adjustment parameters must then obey the following rule:

$$k_{\delta_{ij}} = k_{\delta_{ji}} \text{ et } k_{f_{ij}} = k_{f_{ji}} \qquad [\text{Math. 31}]$$

By ensuring that the sum of the setpoint powers is always zero even with the corrective terms, it is possible to implement such calculations in a higher layer in any type of control. The invention can therefore be easily implemented both when the high-voltage DC network is configured as a master/slave system and when the high-voltage DC network is configured so that the converter stations operate under voltage-droop control.

The synchronizing power term behaves as a transmission line between the converters i and j. In order to emulate a transmission line between converters i and j, all that is required is to calculate an appropriate gain kδ$_{ij}$.

Figure 2:
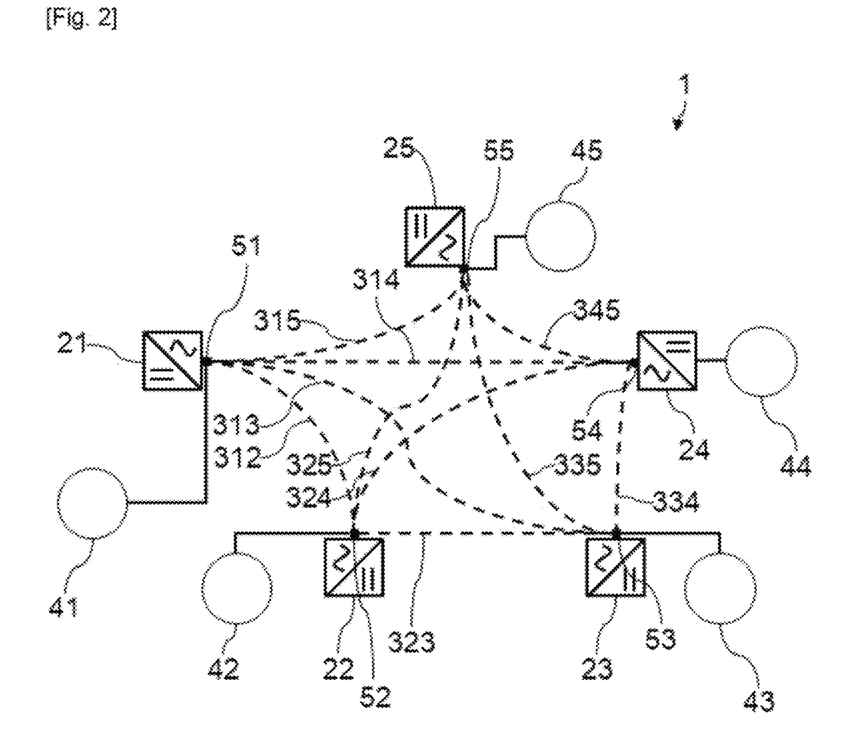
FIG. 2 represents virtual AC connections that can be emulated by the network in FIG. 1.

From the multipoint high-voltage DC network 1, a network of virtual admittances connected to the AC buses can be emulated, even if there are no connections between these AC buses. It can thus be noted that a high-voltage DC network with n number of converter stations has n−1 number of degrees of freedom. FIG. 2 therefore shows virtual AC connections that can be emulated by the network 1 in FIG. 1 with the control method described. Hence, an AC link can be emulated between the AC interface of one of the converter stations 21 to 25, and the AC interface of each of the others of these converter stations 21 to 25. As illustrated:

- AC links 312 to 315 can be emulated between the AC interface of the converter 21 on the one hand and a respective AC interface of each of the converters 22 to 25;
- AC links 323 to 325 can be emulated between the AC interface of the converter 22 on the one hand and a respective AC interface of each of the converters 23 to 25;
- AC links 334 and 335 can be emulated between the AC interface of the converter 23 on the one hand and a respective AC interface of each of the converters 24 and 25;
- an AC link 345 can be emulated between the AC interface of the converter 24 on the one hand and a respective AC interface of the converter 25.

Thus, corrective synchronization power or corrective damping power can always be integrated between two converter stations of the network 1, even if there is no point-to-point high-voltage DC link between these converter stations.

Generally speaking, such a multipoint AC network with a number m of nodes connected to external systems can be reduced to a pattern of lines between these m nodes, by the Kron reduction method.

In particular, the input of synchronization power into the AC network can be achieved in two ways according to the invention.

According to a First Solution:

$$\Delta P_{dcs_i} = \sum_{j=1}^{n} k_{\delta_{ij}}\big((\theta_i - \theta_j) - \theta ref_{ij}\big) \qquad [\text{Math. 32}]$$

θref$_{ij}$ is a reference angle difference calculated by the power flow calculation and determined by a control layer, for example the secondary control.

According to a second solution, the gains kδ$_{ij}$ are calculated in order to obtain the desired equilibrium point. Thus, if the network operator wishes to obtain the power Pdc$_0$ in a steady state, the operator will wish to input synchronization power only between the buses of indices i and j. This power can be broken down as follows:

$$P_{dcs_0} = P_0 + k_{\delta_{ij}}(\theta_i - \theta_j) \qquad [\text{Math. 33}]$$

The values of P$_0$ and kδ$_{ij}$ can therefore be defined in order to obtain the desired value of Pdcs$_0$, in steady state.

The power transmitted between the converter stations i and j per virtual or emulated transmission line can be defined as follows:

$$P_{Vij} = V_i * V_j * Y_{ij} * \sin(\theta_i - \theta_j) \qquad [\text{Math. 34}]$$

Where Y$_{ij}$ is a virtual admittance value emulated between the AC interfaces of the converter stations i and j.

Since Vi and Vj have known values, the desired behaviour can be emulated for the admittance value Y$_{ij}$.

The reference power desired by the operator of the network 1 can be defined as follows:

$$P_{dcs_0}=P_0+k_{\delta_{ij}}*\sin(\theta_i-\theta_j) \quad \text{[Math. 35]}$$

Where $k\delta_{ij}=V_i*V_j*Y_{ij}$. The operator of the network 1 may calculate only the term $P_0$ or set $P_0=0$.

Figure 10:
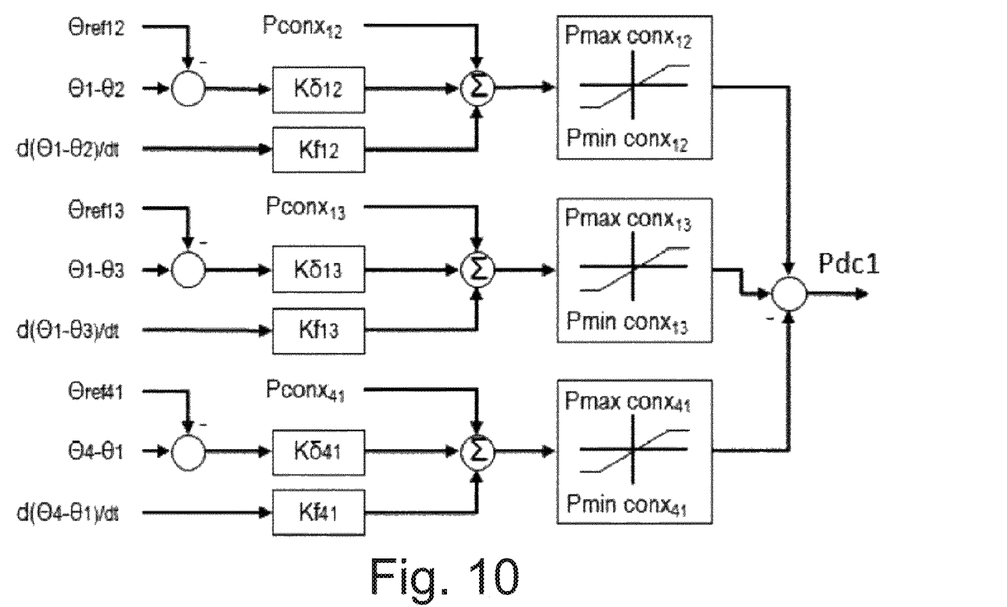
FIG. 10 is a diagram of an example of a method of converter control in a specific case of implementation of the invention.

A practical example of the control of a network with four converter stations is illustrated in FIG. 10, at the converter of index i by implementing power limitations, a damping power correction and a synchronization power correction.

Figure 11:
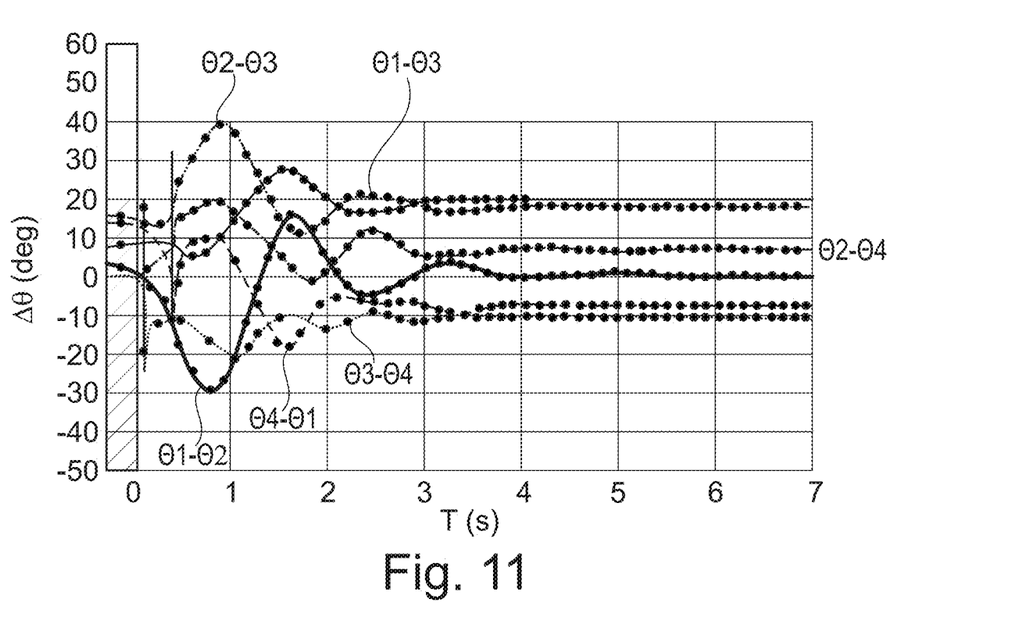
FIG. 11 is a diagram illustrating the evolution of the angle differences for implementation of a network employing the converter control method for the special case in FIG. 10.

FIG. 11 is a diagram illustrating the phase shifts between the AC voltage buses for application to the specific case of the network and the control method described with reference to FIG. 10, during an example of a malfunction. It is noted that all the phase shifts converge, which corresponds to stabilisation of the network after a fairly short time interval.

Figure 5:
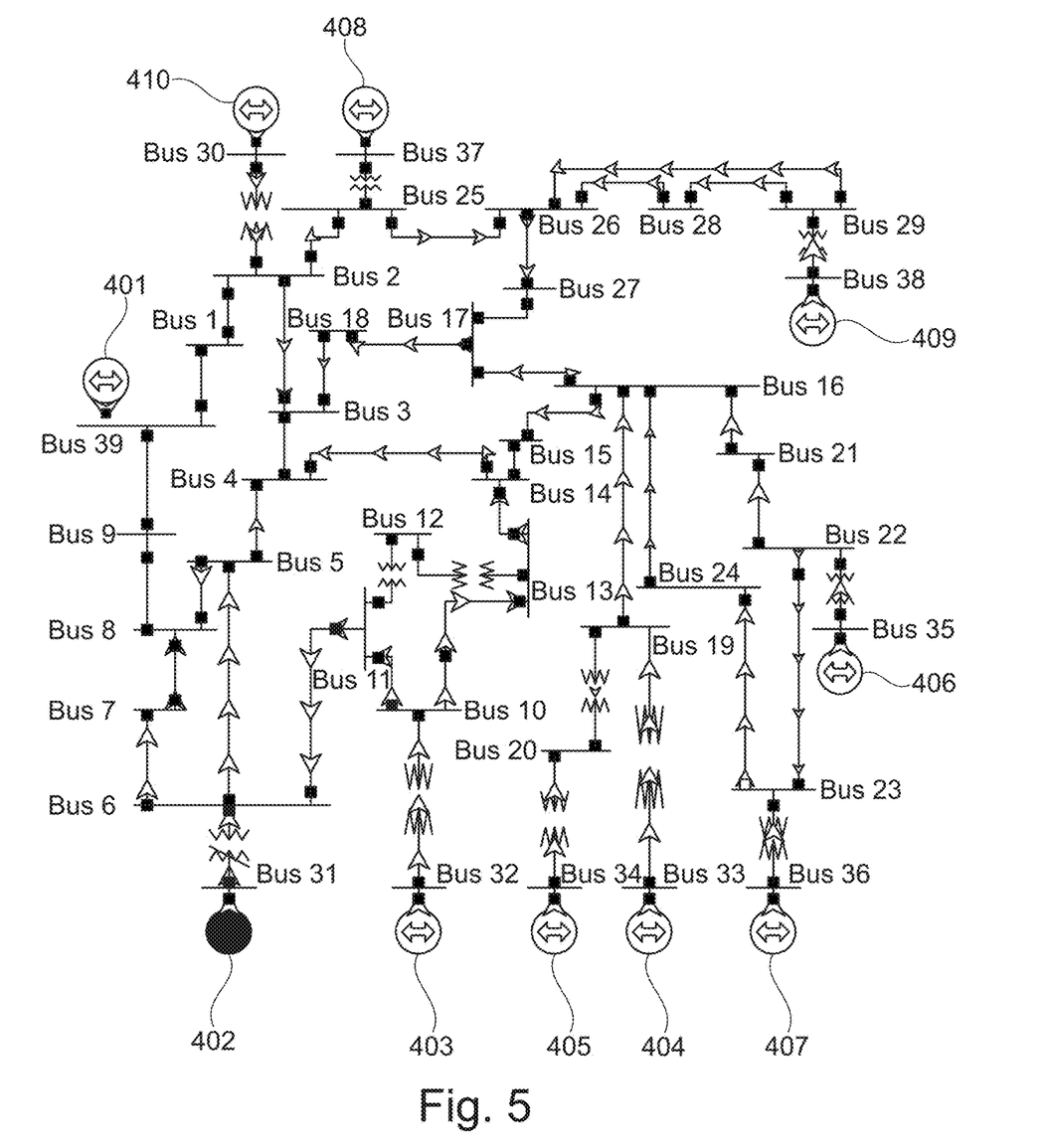
FIG. 5 represents a reference network used to carry out simulations.

Simulations were carried out for the example of the IEEE New England Power Grid Model comprising 39 AC buses and 10 generators 401 to 410, as shown in FIG. 5. In the simulation example, the network has three AC-DC converter stations. In this model, the AC interface of a converter station is connected to the bus with the reference 39. The AC interface of another converter station is connected to the bus with the reference 16. The AC interface of another converter station is connected to the bus with the reference 19.

Figure 9:
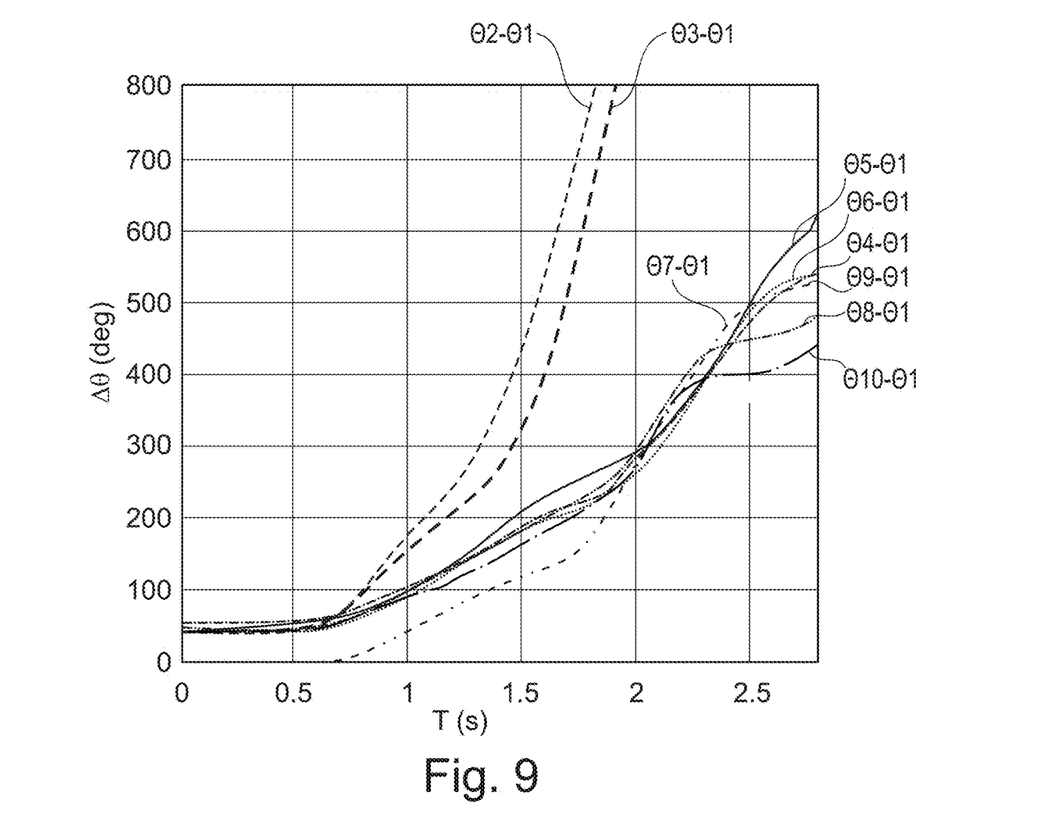
FIG. 9 is a diagram illustrating the desynchronization of generators for the network in FIG. 5 operated according to the state of the art.

A fault occurring on the line between the buses with the references 5 and 8 has been assumed. It is observed that by maintaining the setpoint powers of the converters constant, the generators connected to the buses with the references 31 and 10 gradually become desynchronized and eventually isolated from the system, as illustrated in the results of FIG. 9. The value θi in the diagram in FIG. 9 corresponds to the generator 40i in FIG. 5.

Figure 6:
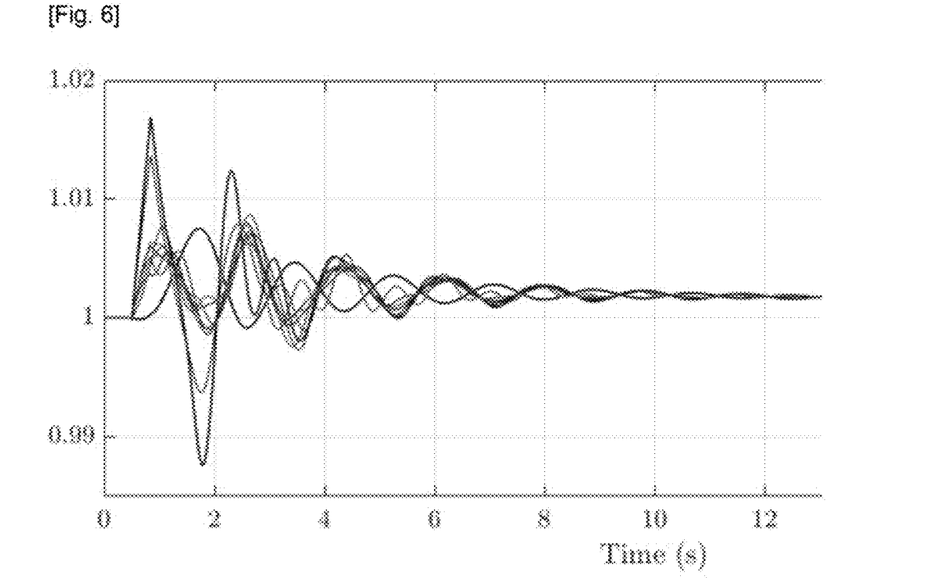
FIG. 6 is a diagram illustrating the evolution of the speed of the reference network generators during implementation of the invention.

On applying a control method according to the invention, the results shown in FIG. 6 were obtained. The diagram in FIG. 6 illustrates the evolution of the speed of the generators as a function of time, following occurrence of a fault on the line between the buses with the references 5 and 8. It is noted that after the fault, all generators experience an oscillation. This oscillation is however damped and the rotation speeds of the generators reach a stable value after a few seconds.

Figure 7:
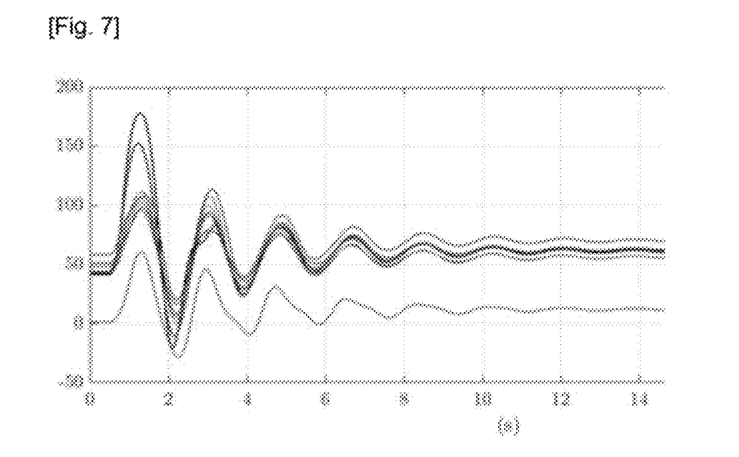
FIG. 7 is a diagram illustrating the evolution of the phase shift between the reference network generators during implementation of the invention.

FIG. 7 illustrates the angular phase shift between the reference generator 1 and the other generators when using a control method according to the invention. It is noted that after a fault, the phase shift oscillates but remains limited. The phase shift is quickly damped and stabilises at a constant value after a few seconds for each of the other generators.

Figure 8:
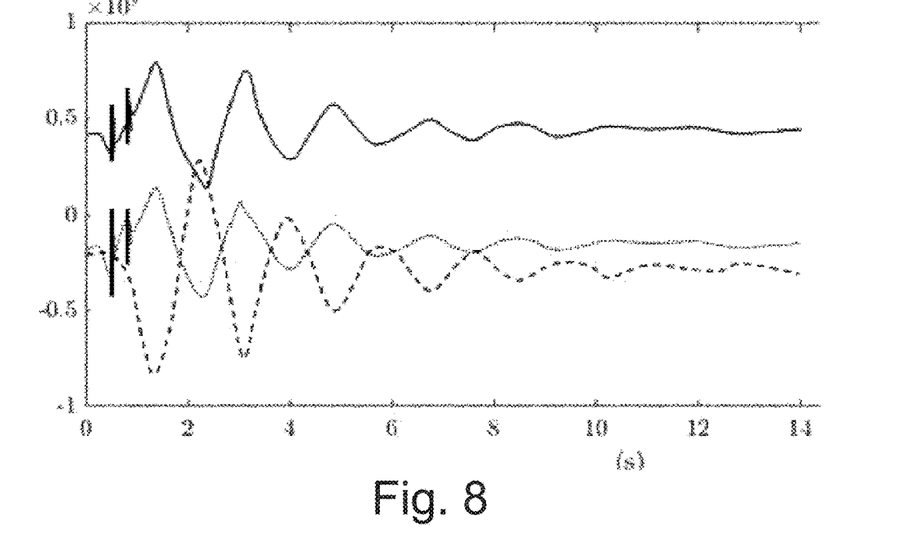
FIG. 8 is a diagram illustrating the evolution of the powers of converters employed by a control method according to the invention in the reference network.

FIG. 8 is a diagram showing the power modulated by the converters, when implementing a control process according to the invention. The power modulations implemented via the corrective terms at the three converter stations make it possible to obtain the results illustrated above.

The invention claimed is:

1. A method of controlling an electrical transmission network, wherein the transmission network comprises a plurality of high-voltage DC lines and n AC/DC converters identified by a respective index, with n being greater than or equal to 3, said converters being interconnected by said high-voltage DC lines, each of said AC/DC converters being connected on the one hand to an AC voltage bus identified by a respective index and on the other hand to one of said high-voltage DC lines, the method comprising:

each of the converters of index i applies a power setpoint $Pdc_i$ with $$Pdc_i = \sum_{j=1}^{n} P_{conx_{ij}} \text{ where } i \neq j \text{ and } P_{conx_{ij}} = -P_{conx_{ji}}.$$

j being an index designating any AC voltage bus and any converter connected thereto among the number n and different from the AC voltage bus of index i and from said converter connected thereto, $Pconx_{ij}$ being a power reference exchanged between the bus of index i and the bus of index j via the electrical transmission network, with n the number of said converters connected to said AC voltage buses;

each converter of index i storing for each of said other converters, the maximum power reference sent $$p_{Conx_{ij}}{}^{Max} \text{ where } i \neq j$$

sent from bus i to bus j via the electrical transmission network;

each converter of index i storing for each of the other converters, the maximum power reference received $$p_{Conx_{ij}}{}^{min} \text{ where } i \neq j$$

received by bus i from bus j via the electrical transmission network;

each converter of index i defining the power reference $Pconx_{ij}$ so that it observes the stored values of maximum power sent and maximum power received.

2. The method for controlling an electrical transmission network according to claim 1, wherein:

each converter of index i stores its maximum active power sent to the transmission network $$P_{DC_i}{}^{Max}$$

and each converter of index i stores its maximum active power received by the transmission network $$P_{DC_i}{}^{min}$$

each converter of index i defining the power reference $Pconx_{ij}$ such that the following relationships are verified:

$$P_{DC_i}^{Max} \geq \sum_{j=1}^{n} P_{Conx_{ij}}^{Max} \text{ where } i \neq j$$

$$P_{DC_i}^{min} \leq \sum_{j=1}^{n} P_{Conx_{ij}}^{min} \text{ where } i \neq j$$

with $$P_{Conx_{ji}}{}^{Max}=-P_{Conx_{ji}}{}^{min} \text{ where } i \neq j.$$

3. The method for controlling an electrical transmission network according to claim 1, wherein:

for each of the converters of index i, a desired active power $Pdc0_i$ applied by a transmission network operator is recovered;

each of the converters of index i modifies the desired active power $Pdc0_i$ by a value $\Delta Pi$, with $Pdc0_i+\Delta Pi=Pdc_i$.

4. The method for controlling an electrical transmission network according to claim 3, comprising:

recovery of the instantaneous values $v_1$ of voltage, and $\theta_i$ of voltage angle or $r_n$ of frequency of the voltage of the index i buses; and wherein:

each of the converters of index i modifies the desired active power $Pdc0_i$ by the value $\Delta Pi$ including a term $\Delta Pdcs_i$ or a term $\Delta Pdca_i$ with:

$$\Delta P_{dcs_i} = \sum_{j=1}^{n} k_{\delta_{ij}}\left((\theta_i - \theta_j) - \theta ref_{ij}\right) \text{ where } i \neq j \text{ and } k_{\delta_{ij}} = k_{\delta_{ji}}$$

$$\Delta P_{dca_i} = \sum_{j=1}^{n} k_{f_{ij}}(f_i - f_j) \text{ where } i \neq j \text{ and } k_{f_{ij}} = k_{f_{ji}}$$

where $k\delta_{ij}$ is a contribution adjustment parameter, $\theta ref_{ij}$ is a reference of the difference of the angles between buses i and j in steady state, and $kf_{ij}$ is a contribution adjustment parameter.

5. The method for controlling an electrical transmission network according to claim 4, wherein $\theta ref_{ij}$ has a non-zero value.

6. The control method according to claim 4, wherein the term $\Delta Pdcs_i$ or the term $\Delta Pdca_i$ is calculated by a calculation circuit of the converter of index i.

7. The method for controlling an electrical transmission network according to claim 1, wherein the converter of index i determines a converter k to which the power value $$P_{Conx_{ik}}$$

exchanged between the bus of index i and the bus of index k via the electrical transmission network is greater than the respective power value that the converter of index i emits to each of the other converters if $(\theta_i - \theta_k) > (\theta_i - \theta_j)$ where $i \neq j$ and $j \neq k$.

8. The method for controlling an electrical transmission network according to claim 1, wherein at least two of said AC voltage buses are interconnected.

9. The method for controlling an electrical transmission network according to claim 1, wherein at least two of said converters do not have their DC interfaces connected point to point via a high-voltage DC line.

* * * * *

UNITED STATES PATENT AND TRADEMARK OFFICE
CERTIFICATE OF CORRECTION

| | | |
|---|---|---|
| PATENT NO. | : 12,132,316 B2 | Page 1 of 1 |
| APPLICATION NO. | : 17/621529 | |
| DATED | : October 29, 2024 | |
| INVENTOR(S) | : Juan Carlos Gonzales et al. | |

It is certified that error appears in the above-identified patent and that said Letters Patent is hereby corrected as shown below:

On the Title Page

Column 1, item (73), Assignee:
Centre National De La Recherche Scientifque

Corrected to:
Centre National De La Recherche Scientifique

Signed and Sealed this
Third Day of December, 2024

Katherine Kelly Vidal
*Director of the United States Patent and Trademark Office*